Dec. 28, 1965   J. D. RICHARD   3,226,670
APPARATUS FOR DETERMINING CHARACTERISTICS OF THE OCEAN BOTTOM
Filed Aug. 24, 1962   3 Sheets-Sheet 1

INVENTOR
Joseph D. Richard

Dec. 28, 1965  J. D. RICHARD  3,226,670
APPARATUS FOR DETERMINING CHARACTERISTICS OF THE OCEAN BOTTOM
Filed Aug. 24, 1962  3 Sheets-Sheet 2

INVENTOR
Joseph D. Richard

Dec. 28, 1965   J. D. RICHARD   3,226,670
APPARATUS FOR DETERMINING CHARACTERISTICS OF THE OCEAN BOTTOM
Filed Aug. 24, 1962                                    3 Sheets-Sheet 3
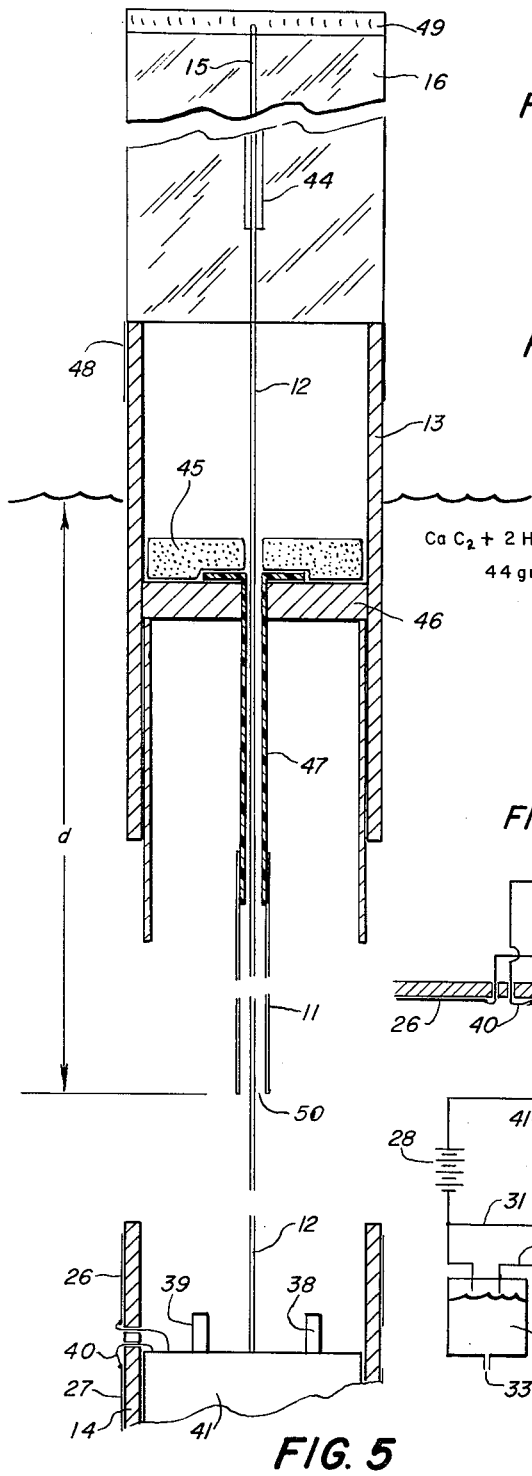
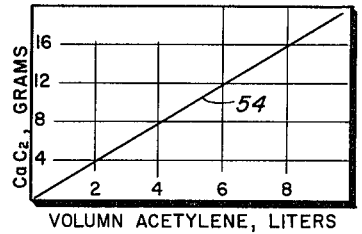
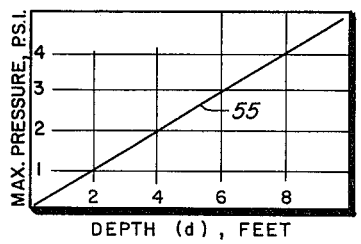
$$Ca\,C_2 + 2\,H_2O \rightarrow Ca\,OH_2 + C_2H_2$$
$$44\,gm. \rightarrow 22.4\,liters$$
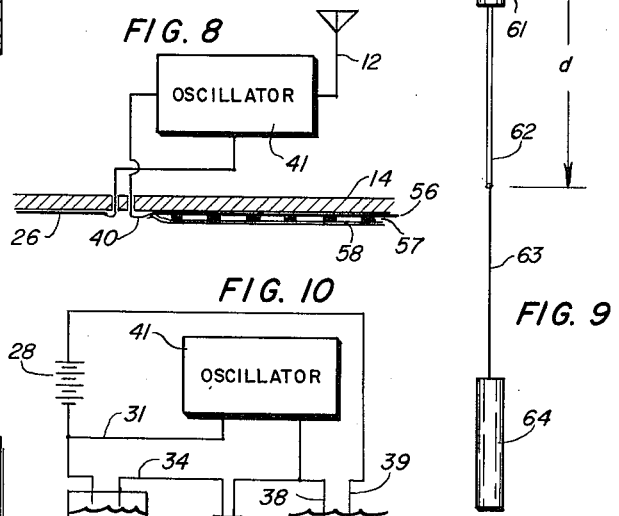
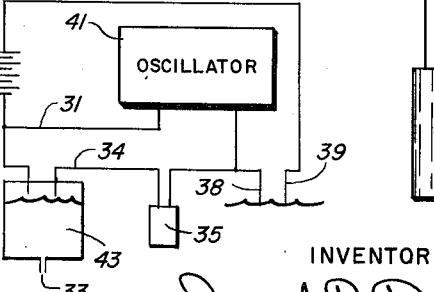
INVENTOR
Joseph D. Richard

United States Patent Office 3,226,670
Patented Dec. 28, 1965

1

3,226,670
APPARATUS FOR DETERMINING CHARACTERISTICS OF THE OCEAN BOTTOM
Joseph D. Richard, Miami, Fla.
(531 S. Barrancas Ave., Warrington, Pensacola, Fla.)
Filed Aug. 24, 1962, Ser. No. 219,227
7 Claims. (Cl. 340—2)

This invention relates generally to apparatus for radio telemetering oceanographic information and more particularly to apparatus whereby certain properties of the ocean bottom may be measured from aircraft.

In the past, sonobuoys have been used for detecting underwater acoustic signals from aircraft using radio telemetry. This techniqueh as become an important method for locating submarines and many refinements and improvements have been made in the sonobuoys and in the operational uses thereof. However, these sonobuoys, as they have been produced in the past, are much too complex and expensive for routine oceanographic work.

An outstanding objection to the sonobuoy used in the past has been the high cost and large size of the units which precluded their use in routine oceanographic measurements from aircraft.

It is the principal object of the present invention to provide expendable apparatus for measuring the broad band acoustic characteristics of the ocean bottom from aircraft. Reflection coefficients and bottom roughness can be determined by suitable analyses of the broad band echoes.

Another object of the present invention is to provide apparatus for echo ranging which is inexpensive enough for routine ocean depth determinations from aircraft. The accuracy of the depth measurements is equal to that obtainable by the most precise shipboard equipment.

An object of the present invention is to provide apparatus suitable for various oceanographic measurements from aircraft which is versatile, inexpensive, and of very small size as compared to conventional sonobuoys.

The present invention provides a small, inexpensive radio telemetering buoy which may be dropped into the ocean from aircraft. When the telemetering buoy falls into the ocean, a bag is inflated within which the antenna is suspended. The inflated bag serves as a support for the antenna and also to protect it from sea water. A method is described whereby the pressure within the bag is positively prevented from exceeding a predetermined value.

Other objects and advantages will become more apparent from the study of the following specifications and drawings in which:

FIGURE 5 shows a sectional view, in greater detail, of the unit floating in the ocean.

FIGURE 6 shows the volumes of gas produced by the reaction of various quantities of calcium carbide with sea water.

FIGURE 7 shows the relationship between maximum inflation pressure and the length of the pressure relief tube according to the preferred form of my invention.

FIGURE 8 shows in detail a capacitive type hydrophone usable with the present invention.

FIGURE 9 shows a spherical balloon antenna support.

FIGURE 10 shows the operation of the sea water switch system for the echo ranging unit shown in FIGURES 2 through 5.

Figure 1:
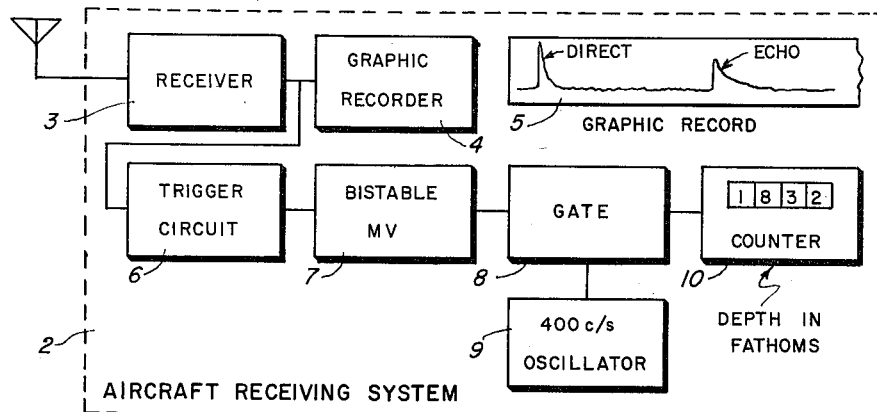
FIGURE 1 is an overall diagram which shows the general method of making oceanographic measurements from an aircraft.
Figure 1:
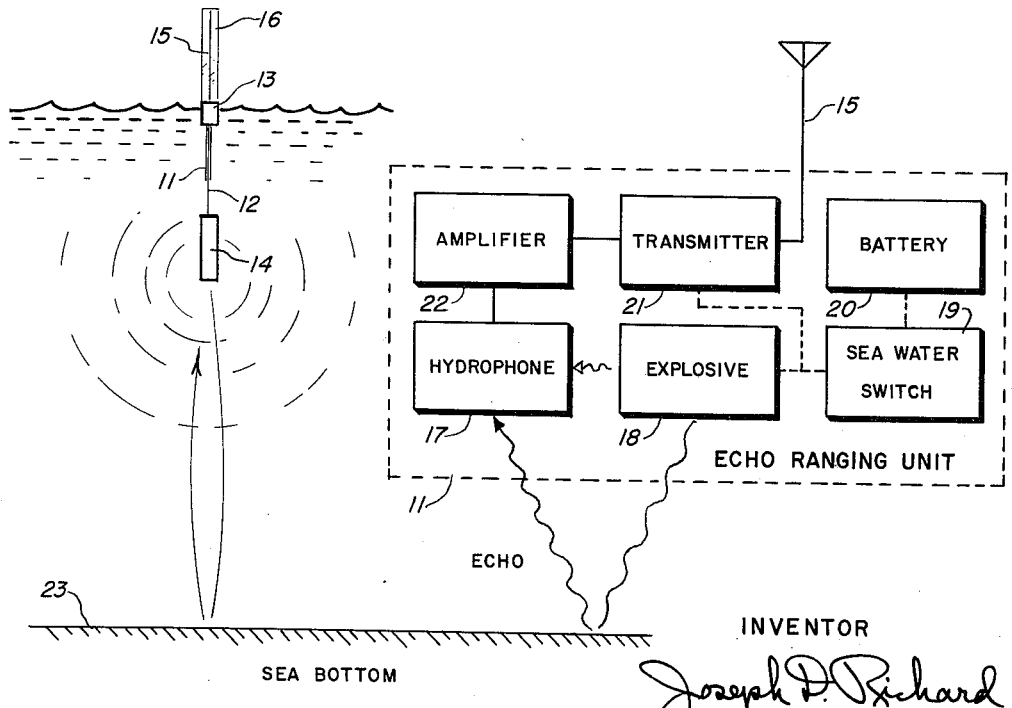

Referring more specifically to FIGURE 1, an aircraft 1 is shown after having dropped a radio telemetering unit into the ocean. An echo sounding system is shown as a specific example of the use of my invention. A small explosive charge is electrically detonated by means of a delayed sea water switch. The lower portion 14 contains a hydrophone, transmitter, and explosive charge. The antenna lead 12 connects the oscillator output to the antenna 15 which is contained in, and is supported by, the inflated plastic sleeve 16. The upper cylindrical portion 13 contains a water reactive chemical which produces the gas required to inflate the sleeve 16 when sea water intrudes up the tube 11. The tube 11 is open at the lower end. The pressure within the sleeve 16 cannot exceed the hydrostatic pressure at the open end of the tube 11. Any desired maximum pressure can thus be positively preselected by the length of the tube 11. All that is required is that a sufficient amount of chemical reagent be provided to achieve the desired pressure. When the unit enters the water, the battery 20 detonates the explosive 18 through the sea water switch 19. The direct sound impulse and the subsequent echoes are picked up by the hydrophone 17 and the resultant signals are amplified by the amplifier 22 which modulates the transmitter 21 feeding the antenna 15. In the aircraft 1, the receiver 3 is used to detect the output of the transmitter 21. Received impulses and echoes are displayed on the graphic recorder 4. A typical received direct impulse and bottom echo are shown on the graphic record 5. Impulses and echoes may be converted to suitable trigger pulses by means of the trigger 6, which are used to trigger the bistable multivibrator 7, which operates the gate circuit 8. Pulses from the oscillator 9 are fed into the counter 10 through the gate 8 only during the time interval between the direct impulse and the bottom echo. If the velocity of sound is assumed to be 800 fathoms per second and the oscillator 9 frequency is 400 cycles per second, the counter 10 would then display the depth directly in fathoms.

Figure 2:
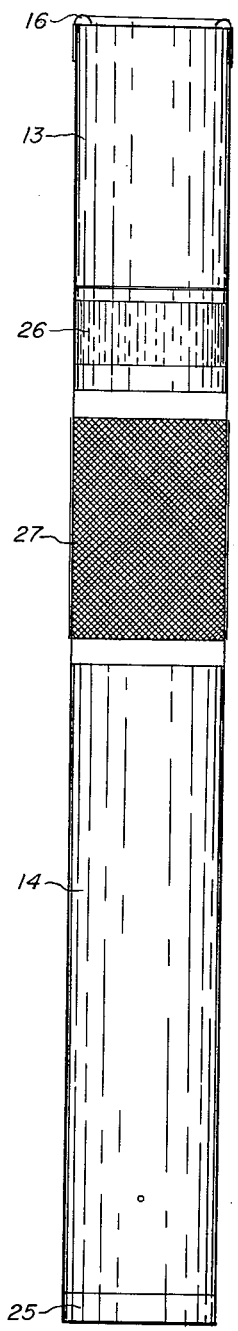
FIGURE 2 shows an exterior view of a preferred type of telemetering unit according to my invention.

FIGURE 2 shows an external view of a form of my invention in which the plastic sleeve containing the antenna is inflated by the gas produced by a chemical reaction with sea water. This rolled up plastic sleeve 16 is stored within the upper end of the upper cylinder 13. A metal band 26 connects to the external sea water which serves as one electrode for the capacitive type hydrophone 27 mounted on the lower cylinder 14.

Figure 3:
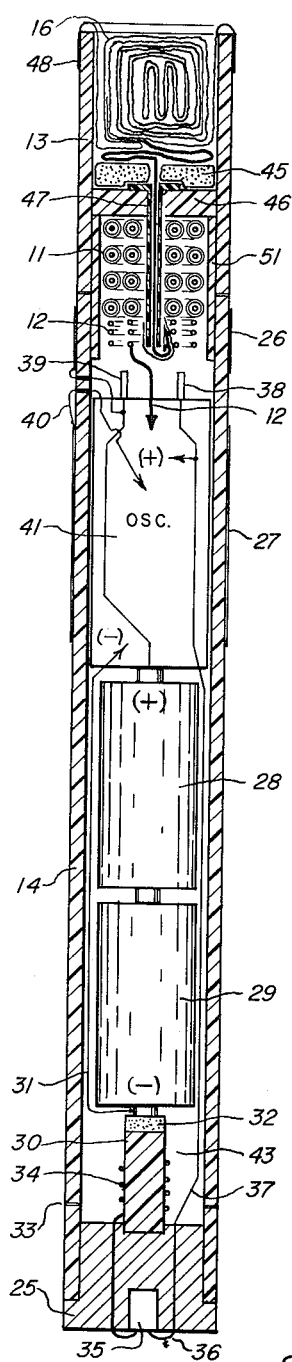
FIGURE 3 shows a sectional view of the same unit before being dropped in the ocean.

FIGURE 3 shows a sectional view of the same unit shown in FIGURE 2. The rolled up plastic sleeve 16 is shown stored within the upper cylinder 13. An oscillator 41 is shown mounted within the lower cylinder 14. A capacitive type hydrophone 27, connected through the lead 40, modulates the oscillator 41. The output of the oscillator 41 feeds the antenna 15 through the lead 12. Batteries 28 and 29 power the oscillator 41 when the electrical contacts 38 and 39 are shorted by immersion in sea water. The electrical blasting cap 35 is detonated when the contacts 38 and 39 are shorted by sea water and the lower compartment 43 is filled with sea water. The lower compartment 43 is slowly filled with water through the small capillary opening 33 so that after a delayed interval the negative side of the battery 29 is shorted to the blasting cap lead 34 which is wrapped around the cylindrical support 30. A rubber pad 32 holds the batteries firmly in place. The lead 31 connects the negative side of the battery 29 to the oscillator 41. The positive side of the battery 28 is connected to the ground side 26 of the condenser hydrophone 27. FIGURE 8 shows the condenser hydrophone in greater detail. The sea water serves as one plate of the condenser hydrophone and the electrode 26 connects the positive side of the battery 28 and the ground side of the oscillator 41 to the sea water. A chemical reagent 45 is shown within the upper cylinder 13. A chemical reagent is used which will produce a gas when reacting with sea water. For example calcium carbide may be used to produce actylene or calcium hydride may be used to produce hydrogen. The upper cylinder 13 is sealed except for the intake fitting 47 through which the antenna lead 12 is fed with a loose fit. The end of a flexible tube 11 is fitted on the exterior end of the fitting 47. The antenna lead 12 runs through the tube 11 with a loose fit. The upper cylinder 13 may be detached from the lower cylinder 14 as shown in FIGURE 4 so that they are joined only by the antenna lead 12 which is covered by the tube 11 along the upper portion of its length.

Figure 4:
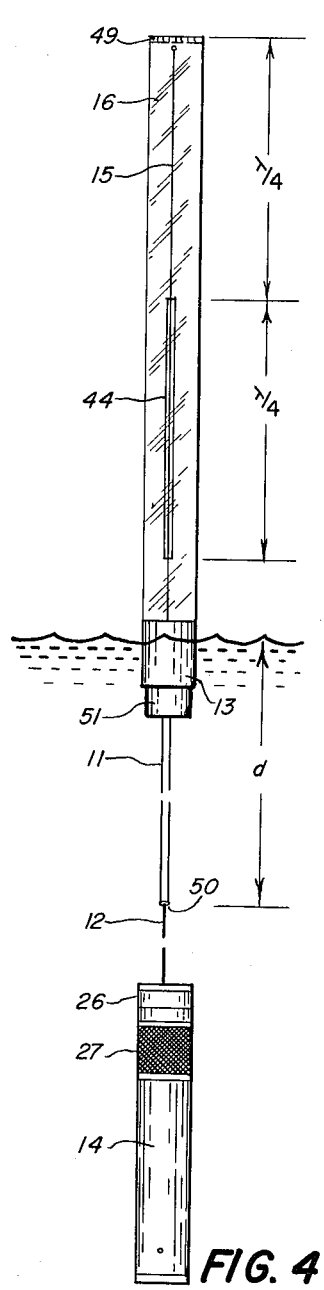
FIGURE 4 shows an overall view of the unit shown in FIGURES 2 and 3 after being dropped in the ocean.

FIGURE 4 shows the radio telemetering unit as it appears in the ocean. The plastic sleeve 16 has been inflated by the reaction of the chemical 45 with sea water which entered through the open end 50 of the tube 11. The depth (d) of the open end 50 of the tube 11 therefore establishes the maximum pressure which can be achieved within the plastic sleeve 16. If the pressure in the plastic sleeve 16 exceeded the hydrostatic pressure at the open end 50 of the tube 11, the excess gas would be expelled from the tube opening 50. In this manner sufficient pressure can be generated to very rigidly inflate the plastic sleeve 16 without the danger of rupturing it. Any desired maximum pressure can thus be preselected for the inflation of the plastic sleeve by the length of the tube 11. This would be about one half pound per square inch pressure for each foot of lentgh of the tube 11. When the plastic sleeve 16 is rigidly inflated the vertical dipole antenna consisting of the two quarter wave sections 15 and 44 are suspended well above the surface of the water. The lower cylinder 14 should be heavy enough to keep the plastic sleeve 16 in a substantially vertical position. The nose piece 25 in which the blasting cap 35 is mounted is made of cast iron to help stabilize the inflated sleeve.

FIGURE 5 shows a cross section view of the same telemetering unit and in particular the details of the upper cylinder 13. Water may enter through the lower end 50 of the tube 11 so that it reacts with the chemical 45 within the cylinder 13. The gas thus generated inflates the plastic sleeve 16 which is sealed at its top end 49. The antenna lead 12 runs from the output of the oscillator 41 up through the tube 11 and the intake fitting 47 and thence to feed the dipole antenna sections 15 and 44. The input of the oscillator 41 is connected to the condenser hydrophone 27 through the lead 40. The ground side of the oscillator and the condenser hydrophone is connected to the sea water at 26. When immersed, the sea water contacts 38 and 39 are shorted as shown schematically in FIGURE 10.

FIGURE 6 shows the volumes of acetylene which can be obtained from various quantities of calcium carbide at standard temperature and pressure.

FIGURE 7 shows the relationship between the depth (d) of the open end 50 of the tube 11 and the maximum pressure achievable in the inflated antenna support according to my invention.

FIGURE 8 shows the condenser hydrophone which modulates the oscillator 41. A perforated plastic sheet 57 covers the thin metal surface 56 which is deposited on the outside of the lower cylinder 14. The metal surface 56 serves as one electrode of a condenser hydrophone. The air spaces in the perforated plastic sheet 57 serve as the pressure variable dielectric. A waterproof plastic film 58 covers entirely the perforated plastic sheet 57. The sea water on the outside of the plastic film 58 serves as the second electrode of the condenser hydrophone. The metal surface 26, exposed to the sea water, serves to connect the sea water side of the condenser hydrophone to the ground side of the oscillator 41.

FIGURE 9 shows a similar type of telemetering unit in which a folded half-wave dipole 60 is suspended within a spherical balloon 59. As described before, the depth (d) of the lower end of the tube 62 establishes the maximum internal pressure to which the balloon 59 can be subjected.

FIGURE 10 shows the organization of the sea water switches. Immediately upon immersion the contacts 38 and 39 are shorted by sea water thereby energizing the oscillator 41 and one side of the explosive detonator 35. After a delayed time interval the cavity 43 is filled with water through the capillary 33 so that the other lead 34 of the detonator 35 is connected to the negative side of the battery and the detonation occurs. There is a relatively high resistance between the inside of the cavity 43 and the outside water due to the small diameter of the capillary opening 33.

It will be seen therefore that I have provided apparatus for radio telemetering oceanographic information from the surface of the ocean to an aircraft. The apparatus described may be used for surveys from aircraft of the acoustic characteristics of the ocean bottom. Ocean depth, reflection coefficient, bottom roughness, and certain sub-bottom features may all be determined when the received signals are properly analyzed. When combined with a more powerful explosive source, these small inexpensive units may be used for submarine detection. In particular, they should prove valuable as a supplemental target classification system for use with magnetic detection equipment. Sub-bottom echo ranging from an aircraft may also be carried out with these units if a more powerful explosive source is added. The simple, low powered echo ranging units may also allow aircraft to regularly use the ocean depth as a supplemental navigation aid.

The condenser type hydrophone shown herein is described in greater detail in U.S. Patent Number 2,965,-877 by J. H. Stein, et al., entitled Capacitive-Type Line Hydrophone. Obviously other types of hydrophones could be used in place of the capacitive type shown. Although a chemical reaction gas generator is shown herein as an example of a sea water activated inflation system several alternate means are available which are also suitable for performing this function.

Various modifications and adaptations may be suggested by those skilled in the art without departing from the spirit and scope of the invention as defined in the following claims.

What is claimed is:

1. Apparatus for telemetering information from the surface of the ocean comprising: a housing suitable for dropping into the ocean from an aircraft; a battery within the said housing; a radio frequency oscillator within the said housing which is powered by the said battery; a transducer for generating an electrical signal in response to some physical characteristic of the said ocean; means for modulating the said oscillator with the output of the said transducer; an inflatable plastic bag attached to the said housing; a flexible antenna suspended within the said bag, the said antenna being energized by the output of the said modulated oscillator; means for inflating the said bag when the said housing is dropped in the water; and a tube venting into the said plastic bag at one end and open to the sea water at the opposite end, the said tube extending vertically beneath the said housing to a predetermined depth in the ocean, the said bag being thereby inflated to a pressure not exceeding the hydrostatic pressure at the open lower end of the said tube.

2. Apparatus for detecting ascoustic signals in the ocean comprising: an elongated cylindrical housing suitable for dropping into the ocean; a battery within the said housing; an elongated inflatable plastic sleeve attached to the upper end of the said cylindrical housing; a flexible antenna attached within the said plastic sleeve; means for inflating the said plastic sleeve when the said housing is dropped in the ocean, the said antenna being thereby suspended within the said sleeve in a vertical position substantially above the surface of the water; a tube venting into the said plastic sleeve at one end and open to the sea water at the opposite end, the said tube hanging beneath the said housing to a predetermined depth in the ocean, the gas pressure within the said plastic sleeve, when inflated, thereby not exceeding the hydrostatic pressure at the open lower end of the said tube, means for radiating an electromagnetic signal from the said antenna; a hydrophone for detecting ascoustic signals in the water surrounding the said housing; and means for modulating the said electromagnetic signals according to the output of the said hydrophone.

3. Apparatus of the character described comprising in combination: a housing suitable for dropping into the ocean from an aircraft; a battery within the said housing; a radio frequency oscillator within the said housing which is powered by the said battery; a hydrophone for detecting acoustic signals in the water surrounding the said housing; means for modulating the said oscillator with the output of the said hydrophone; an inflatable balloon attached to the said housing; a flexible antenna suspended within the said balloon, the said antenna being energized by the output of the said modulated oscillator; means for inflating the said balloon when the said housing is dropped in the water, the said antenna being thereby supported substantially above the surface of the water; a tube venting into the said balloon at one end and open to the sea water at the opposite end, the said tube hanging beneath the said housing to a predetermined depth in the ocean, the gas pressure within the said balloon, when inflated, thereby not exceeding the hydrostatic pressure at the lower end of the said tube, an electrically detonated explosive charge attached to the said housing and ventable to the surrounding water; and means for detonating the said explosive charge with the said battery after the said housing has been dropped in the ocean, radio signals being thereby transmitted which correspond to the detonation of the said explosive charge and the echoes which result therefrom.

4. Apparatus of the character described comprising: an elongated cylindrical housing suitable for dropping in the ocean; a battery within the said housing; an elongated inflatable plastic sleeve attached to the upper end of the said cylindrical housing; a flexible antenna attached within the said plastic sleeve; means for inflating the said plastic sleeve when the said housing is dropped in the ocean, the said antenna being thereby suspended within the said sleeve in a vertical position substantially above the surface of the water; a tube venting into the said plastic sleeve at one end and open to the sea water at the opposite end, the said tube hanging beneath the said housing to reach a predetermined depth beneath the surface of the water, the gas pressure within the said plastic sleeve, when inflated, thereby not exceeding the hydrostatic pressure at the lower end of the said tube, means for radiating an electromagnetic signal from the said antenna; a hydrophone for detecting acoustic signals in the medium surrounding the said housing; means for modulating the said electromagnetic signal according to the output of the said hydrophone; an electrically detonated explosive charge attached to the said housing; and means for detonating the said explosive charge with the said battery after the said housing has been dropped in the ocean, radio signals being thereby transmitted which are indicative of the depth of the said ocean.

5. Echo ranging apparatus to be dropped into a body of water comprising: a housing; a radio transmitter in said housing; an antenna for said transmitter; an inflatable float for holding said antenna above the surface of the water; means for inflating the said float upon contact with the water; a transducer for modulating the output of the said transmitter in response to sound vibrations; an electrically detonatable explosive charge for producing sound vibrations to be reflected from the bottom of the body of water; battery means in said housing for supplying power to said transmitter and to said explosive charge; a first sea water switch for connecting said battery means to said transmitter immediately upon immersion of the apparatus in the water; a second sea water switch for connecting said battery means to said explosive charge; and means for delaying the action of said second switch for a predetermined time after immersion to enable the transmitter to be turned on and to enable the apparatus to become stabilized in the water before the charge is detonated.

6. Expendable apparatus for determining the acoustic characteristics of the ocean bottom from an aircraft comprising: a housing suitable for dropping in the ocean from an aircraft; a radio transmitter within the said housing; an antenna for said transmitter; an inflatable plastic balloon attached to one end of the said housing for holding the said antenna above the surface of the water; means for inflating said balloon upon contact with the water; a hydrophone for modulating the output of the said transmitter in response to received acoustic energy; an electrically detonatable explosive charge for producing an acoustic pulse having a broad band of frequencies to be reflected from the ocean bottom; battery means in said housing for supplying power to said transmitter and to said explosive charge; means for activating the said battery immediately upon immersion of the apparatus in the water, the said transmitter being thereby operable; and a delay device for connecting the said battery to the said explosive charge a predetermined time interval after activation of the said battery, the said charge being thereby detonated after the said transmitter has become fully operative.

7. Expendable apparatus for determining the acoustic characteristics of the ocean bottom from an aircraft comprising: a housing suitable for dropping in the ocean from an aircraft; a radio transmitter within the said housing; an inflatable plastic container attached to one end of the said housing; a flexible antenna for the said transmitter attached within the said plastic container; a hydrophone for modulating the output of the said transmitter according to received acoustic energy; means for inflating the said container when the said housing is dropped in the ocean, the said flexible antenna being thereby erected within the said plastic container substantially above the surface of the water; an electrically detonatable explosive charge for producing an acoustic pulse having a broad band of frequencies to be reflected from the ocean bottom; battery means in said housing for supplying power to said transmitter and to the said explosive charge; a sea water switch for connecting the said transmitter to the said battery, the said switch having contacts immediately bridgeable by sea water when the apparatus is dropped in the ocean; and a delayed sea water switch for connecting the said explosive charge to the said battery, the said delayed switch having contacts bridgeable by sea water only after a predetermined time interval after the apparatus is dropped in the ocean, the detonation being thereby delayed until after the said transmitter has become fully operative.

(References on following page)

References Cited by the Examiner

UNITED STATES PATENTS

| | | | |
|---|---|---|---|
| 2,520,814 | 8/1950 | Rule | 340—4 X |
| 2,780,795 | 2/1957 | Ambrosio | 340—3 |
| 2,968,053 | 1/1961 | Gogolick et al. | 9—8 |
| 2,978,668 | 4/1961 | Kurie et al. | 340—2 |
| 3,006,002 | 10/1961 | Pingree et al. | 9—8 |
| 3,038,143 | 6/1962 | Dow | 340—5 |
| 3,093,808 | 6/1963 | Tatanall et al. | 340—2 |

FOREIGN PATENTS

| | | | |
|---|---|---|---|
| 1,226,674 | 2/1960 | France | 340—2 |

CHESTER L. JUSTUS, *Primary Examiner.*

KATHLEEN H. CLAFFY, *Examiner.*